(12) United States Patent
Chiang (10) Patent No.: US 10,361,729 B2
(45) Date of Patent: Jul. 23, 2019

(54) DUAL-FREQUENCY ANTENNA DEVICE AND LOW-FREQUENCY ANTENNA MODULE

(71) Applicant: AUDEN TECHNO CORP., Taoyuan (TW)

(72) Inventor: Chi-Ming Chiang, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 140 days.

(21) Appl. No.: 15/699,195

(22) Filed: Sep. 8, 2017

(65) Prior Publication Data
US 2019/0081647 A1 Mar. 14, 2019

(51) Int. Cl.
*H01Q 3/24* (2006.01)
*H04B 1/00* (2006.01)
*H01Q 5/50* (2015.01)

(52) U.S. Cl.
CPC .............. *H04B 1/006* (2013.01); *H01Q 5/50* (2015.01)

(58) Field of Classification Search
CPC ............. H01Q 5/20; H01Q 3/24; H04B 1/006
USPC ........................................................ 343/876
See application file for complete search history.

(56) References Cited

U.S. PATENT DOCUMENTS

| | | | | |
|---|---|---|---|---|
| 7,834,813 B2* | 11/2010 | Caimi | ................... | H01Q 9/045 343/745 |
| 9,484,619 B2* | 11/2016 | Korva | ................... | H01Q 1/243 |
| 9,640,863 B2* | 5/2017 | Shen | ................... | H04B 1/0458 |
| 2006/0281423 A1* | 12/2006 | Caimi | ................... | H01Q 1/243 455/129 |
| 2007/0222697 A1* | 9/2007 | Caimi | ................... | H01Q 1/243 343/861 |

* cited by examiner

*Primary Examiner* — Huedung X Mancuso
(74) *Attorney, Agent, or Firm* — Li & Cai Intellectual Property (USA) Office (57) ABSTRACT

A low-frequency antenna module includes two switching units, a first matching circuit, a second matching circuit, and a low-frequency antenna. Each of the two switching units includes an electrical connection point, a first switching point, and a second switching point. The first matching circuit is electrically connected to the two first switching points, the second matching circuit is electrically connected to the two second switching points, and the low-frequency antenna is electrically connected to one of the two electrical connection points. The two switching units are synchronously operated to electrically connect the two electrical connection points to the two first switching points or to the two second switching points. Thus, the low-frequency antenna can be applied to match the first matching circuit in a first low-frequency band or the second matching circuit in a second low-frequency band different from the first low-frequency band.

10 Claims, 10 Drawing Sheets

DUAL-FREQUENCY ANTENNA DEVICE AND LOW-FREQUENCY ANTENNA MODULE

BACKGROUND OF THE INVENTION

1. Field of the Invention

The present disclosure relates to an antenna device; in particular, to a dual-frequency antenna device and a low-frequency antenna module.

2. Description of Related Art

The conventional antenna device can be used to different frequency bands by using a switch, and each switching point of the switch and a ground are provided with a matching member there-between. However, when the conventional antenna device is in operation by choosing one of the switching points of the switch, the operation of the conventional antenna device is easily affected by the adjacent matching members, which are connected to the other non-chosen switching points of the switch, such that the antenna performance will be reduced.

SUMMARY OF THE INVENTION

The present disclosure provides a dual-frequency antenna device and a low-frequency antenna module to effectively improve the drawbacks associated with conventional antenna devices.

The present disclosure discloses a dual-frequency antenna device, which includes a diplexer, a high-frequency antenna, and a low-frequency antenna module. The diplexer includes an antenna contact, a high-frequency contact, a low-frequency contact, and a plurality of grounding contacts. The high-frequency antenna is electrically connected to the high-frequency contact of the diplexer. The low-frequency antenna module includes two switching units, a first matching circuit, a second matching circuit, and a low-frequency antenna. The two switching units each include an electrical connection point, a first switching point, and a second switching point. The two switching units are synchronously operated to electrically connect the two electrical connection points to the two first switching points or to the two second switching points. The first matching circuit is electrically connected to the two first switching points of the two switching units. The second matching circuit is electrically connected to the two second switching points of the two switching units. The low-frequency antenna is electrically connected to one of the two electrical connection points, and the other electrical connection point is electrically connected to the low-frequency contact of the diplexer. When the two electrical connection points are respectively and electrically connected to the two first switching points, the low-frequency antenna is electrically connected to the first matching circuit for being operated in a first low-frequency band. When the two electrical connection points are respectively and electrically connected to the two second switching points, the low-frequency antenna is electrically connected to the second matching circuit for being operated in a second low-frequency band different from the first low-frequency band.

The present disclosure also discloses a low-frequency antenna module, which includes two switching units, a first matching circuit, a second matching circuit, and a low-frequency antenna. The two switching units each include an electrical connection point, a first switching point, and a second switching point. The two switching units are synchronously operated to electrically connect the two electrical connection points to the two first switching points or to the two second switching points. The first matching circuit is electrically connected to the two first switching points of the two switching units. The second matching circuit is electrically connected to the two second switching points of the two switching units. The low-frequency antenna is electrically connected to one of the two electrical connection points. When the two electrical connection points are respectively and electrically connected to the two first switching points, the low-frequency antenna is electrically connected to the first matching circuit for being operated in a first low-frequency band. When the two electrical connection points are respectively and electrically connected to the two second switching points, the low-frequency antenna is electrically connected to the second matching circuit for being operated in a second low-frequency band different from the first low-frequency band.

In summary, for the dual-frequency antenna device or the low-frequency antenna module of the present disclosure, the first matching circuit and the second matching circuit are respectively arranged in the different signal paths, which are independent from each other, so that the different signal paths do not interfere with each other. Thus, the low-frequency antenna module can be used to obtain a better antenna performance on different low-frequency bands.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Reference is made to FIGS. 1 to 10, which illustrates the present disclosure. References are hereunder made to the detailed descriptions and appended drawings in connection with the present disclosure. However, the appended drawings are merely provided for exemplary purposes, and should not be construed as restricting the scope of the present disclosure.

First Embodiment

Figure 1:
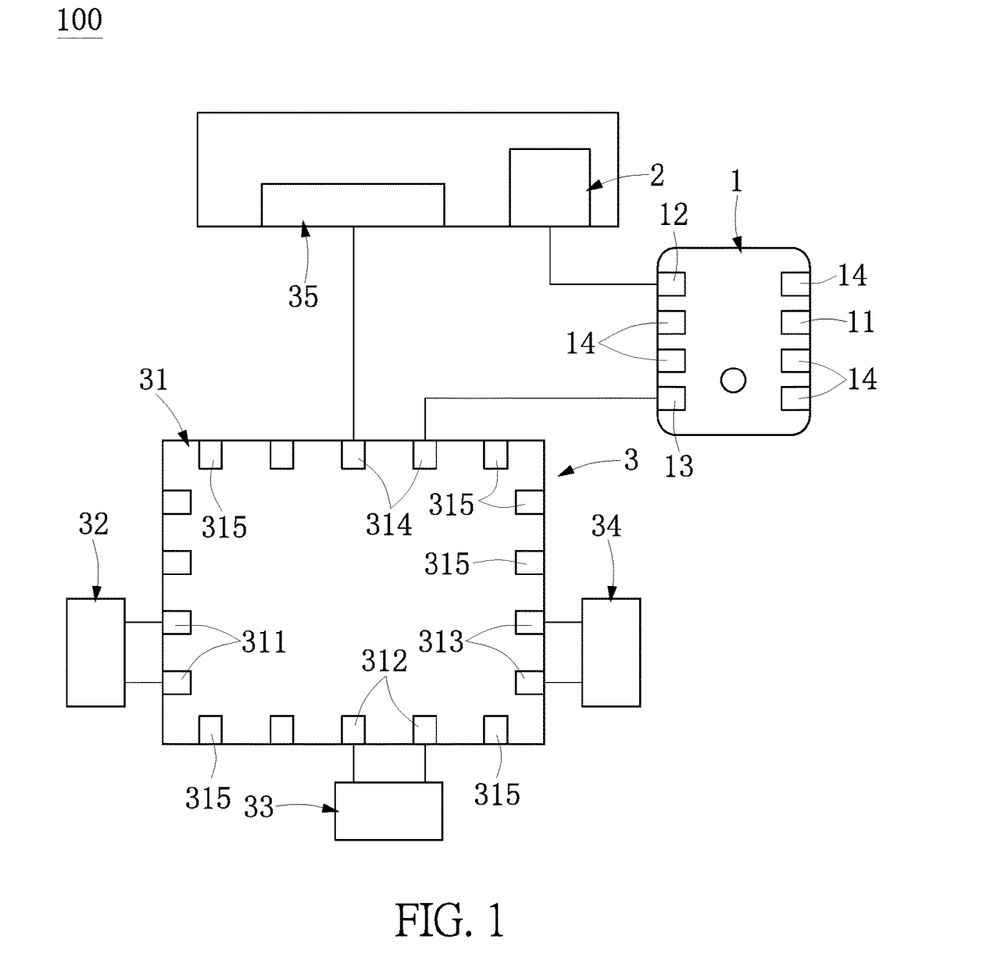
FIG. 1 is a schematic view showing a dual-frequency antenna device according to a first embodiment of the present disclosure.
Figure 2:
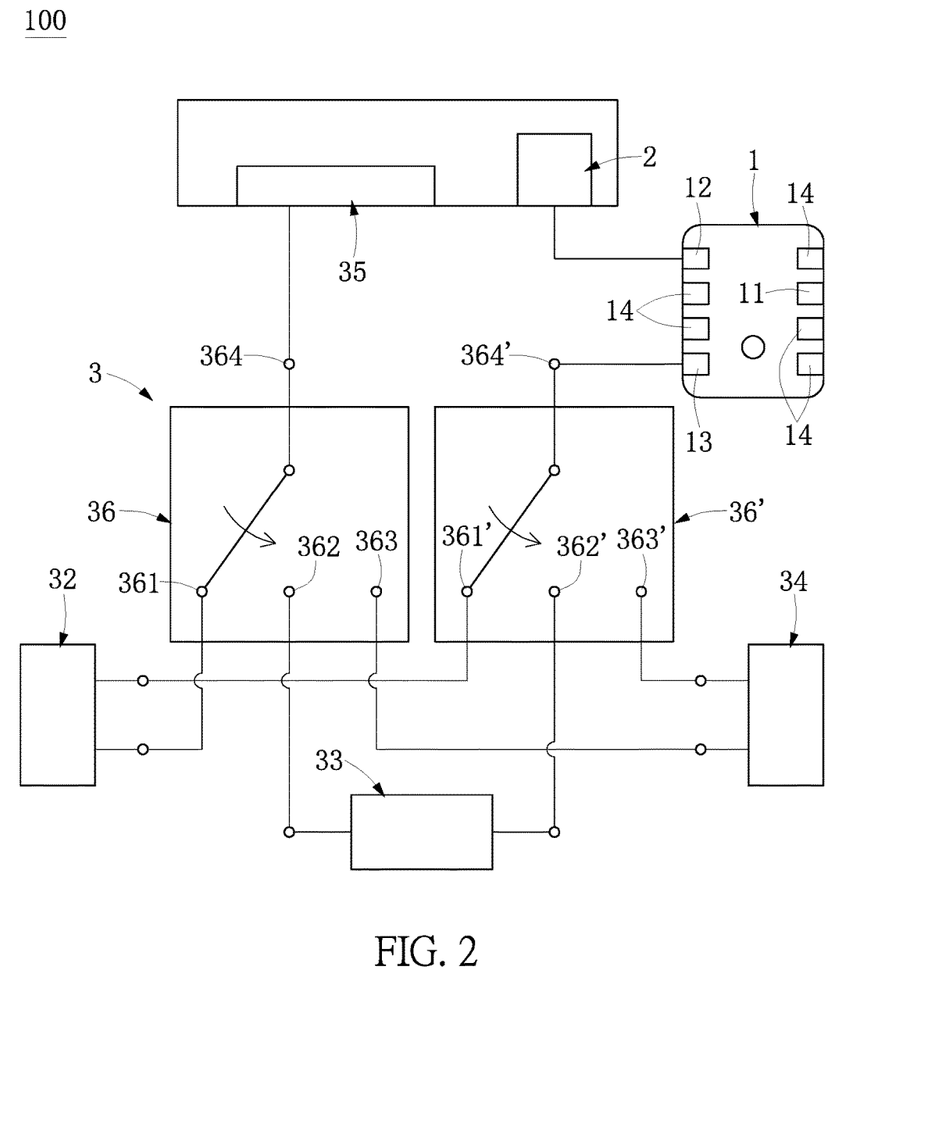
FIG. 2 is a schematic view showing the dual-frequency antenna device in another structure according to the first embodiment of the present disclosure.

Reference is first made to FIGS. 1 to 8, which illustrates a dual-frequency antenna device 100 of a first embodiment of the present disclosure. As shown in FIGS. 1 and 2, the dual-frequency antenna device 100 includes a diplexer 1, a high-frequency antenna 2, and a low-frequency antenna module 3. The high-frequency antenna 2 and the low-frequency antenna module 3 are electrically connected to the diplexer 1. The following description discloses the structure and connection of the components of the dual-frequency antenna device 100.

As shown in FIG. 1, the diplexer 1 in the present embodiment includes an antenna contact 11, a high-frequency contact 12, a low-frequency contact 13, and a plurality of grounding contacts 14. The high-frequency contact 12 and the low-frequency contact 13 are electrically connected to the antenna contact 11. Any two of the antenna contact 11, the high-frequency contact 12, and the low-frequency contact 13 are provided with at least one of the grounding contacts 14 arranged there-between. For example, as shown in FIG. 1, when the contacts of the diplexer 1 are counted from the lower right contact in a counterclockwise direction, the third contact is the antenna contact 11, the fifth contact is the high-frequency contact 12, the eighth contact is the low-frequency contact 13, and the other contacts are the grounding contacts 14.

The high-frequency antenna 2 is electrically connected to the high-frequency contact 12 of the diplexer 1. For example, the high-frequency antenna 2 is connected (e.g., soldered) to the high-frequency contact 12 of the diplexer 1. Moreover, the high-frequency antenna 2 is preferably operated in a high-frequency band within a range of 1427 MHz to 2690 MHz, but the present disclosure is not limited thereto. That is to say, the structure and the operating band of the high-frequency antenna 2 can be adjusted according to user demands.

The low-frequency antenna module 3 in the present embodiment is cooperated with the diplexer 1 and the high-frequency antenna 2, but the present disclosure is not limited thereto. For example, in other embodiments, the low-frequency antenna module 3 of the present disclosure can be independently used or can be cooperated with other components.

In the present embodiment, the low-frequency antenna module 3 includes a DP3T switch 31, a first matching circuit 32, a second matching circuit 33, a third matching circuit 34, and a low-frequency antenna 35. The first matching circuit 32, the second matching circuit 33, the third matching circuit 34, and the low-frequency antenna 35 are arranged outside of the DP3T switch 31 and are electrically connected to the DP3T switch 31. The high-frequency antenna 2 and the low-frequency antenna 35 can be formed on the same carrier, but the present disclosure is not limited thereto. The following description discloses the structure and connection of the components of the low-frequency antenna module 3.

The DP3T switch 31 includes two input terminals 314, two first output terminals 311, two second output terminals 312, two third output terminals 313, and a plurality of grounding contacts 315. Any two different terminals of the two input terminals 314, the two first output terminals 311, the two second output terminals 312, and the two third output terminals 313 are provided with at least one of the grounding terminals 315 arranged there-between. For example, as shown in FIG. 1, the terminals of the DP3T switch 31 are respectively arranged on four edges of the DP3T switch 31, in which the two input terminals 314 are arranged on an upper edge, the two first output terminals 311 are arranged on a right edge, the two second output terminals 312 are arranged on a lower edge, and the two third output terminals 313 are arranged on a left edge.

Moreover, one of the two input terminals 314 of the DP3T switch 31 is connected to the low-frequency antenna 35, and the other input terminal 314 is connected to the low-frequency contact 13 of the diplexer 1. The two first output terminals 311 are connected to the first matching circuit 32, the two second output terminals 312 are connected to the second matching circuit 33, and the two third output terminals 313 are connected to the third matching circuit 34.

Thus, the low-frequency antenna module 3 in the present embodiment can change the conventional usage of the DP3T switch 31 by electrically connecting the DP3T switch 31 to the low-frequency antenna 35 and different matching circuits (i.e., the first matching circuit 32, the second matching circuit 33, and the third matching circuit 34), so that the different matching circuits are respectively connected to independent signal paths. Thus, the different matching circuits do not interfere with each other, and the low-frequency antenna module 3 can be used to obtain a better antenna performance.

In other words, as shown in FIG. 2, the DP3T switch 31 includes two switching units 36, 36' installed therein. Each of the two switching units 36, 36' includes a first switching point 361, 361', a second switching point 362, 362', a third switching point 363, 363', and an electrical connection point 364, 364'. The two switching units 36, 36' are synchronously operated to electrically connect the two electrical connection points 364, 364' to the two first switching points 361, 361', to the two second switching points 362, 362', or to the third switching points 363, 363'. That is to say, the two switching units 36, 36' in the present embodiment are not electrically connected to different switching points (e.g., the two switching units 36, 36' are not electrically connected to the first switching point 361 and the second switching point 362').

Specifically, the following description discloses the relationship between the terminals of the DP3T switch 31 and the two switching units 36, 36'. The two input terminals 314 of the DP3T switch 31 are respectively and electrically connected to the two electrical connection points 364, 364' of the two switching units 36, 36', so that one of the two electrical connection points 364, 364' (i.e., the electrical connection point 364) is electrically connected to the low-frequency antenna 35, and the other electrical connection point 364' is electrically connected to the low-frequency contact 13 of the diplexer 1.

Moreover, the two first output terminals 311 of the DP3T switch 31 are respectively and electrically connected to the two first switching points 361, 361', so that the two first switching points 361, 361' are electrically connected to the first matching circuit 32. The two second output terminals 312 of the DP3T switch 31 are respectively and electrically connected to the two second switching points 362, 362', so that the two second switching points 362, 362' are electrically connected to the second matching circuit 33. The two third output terminals 313 of the DP3T switch 31 are respectively and electrically connected to the two third switching points 363, 363', so that the two third switching points 363, 363' are electrically connected to the third matching circuit 34.

Figure 3:
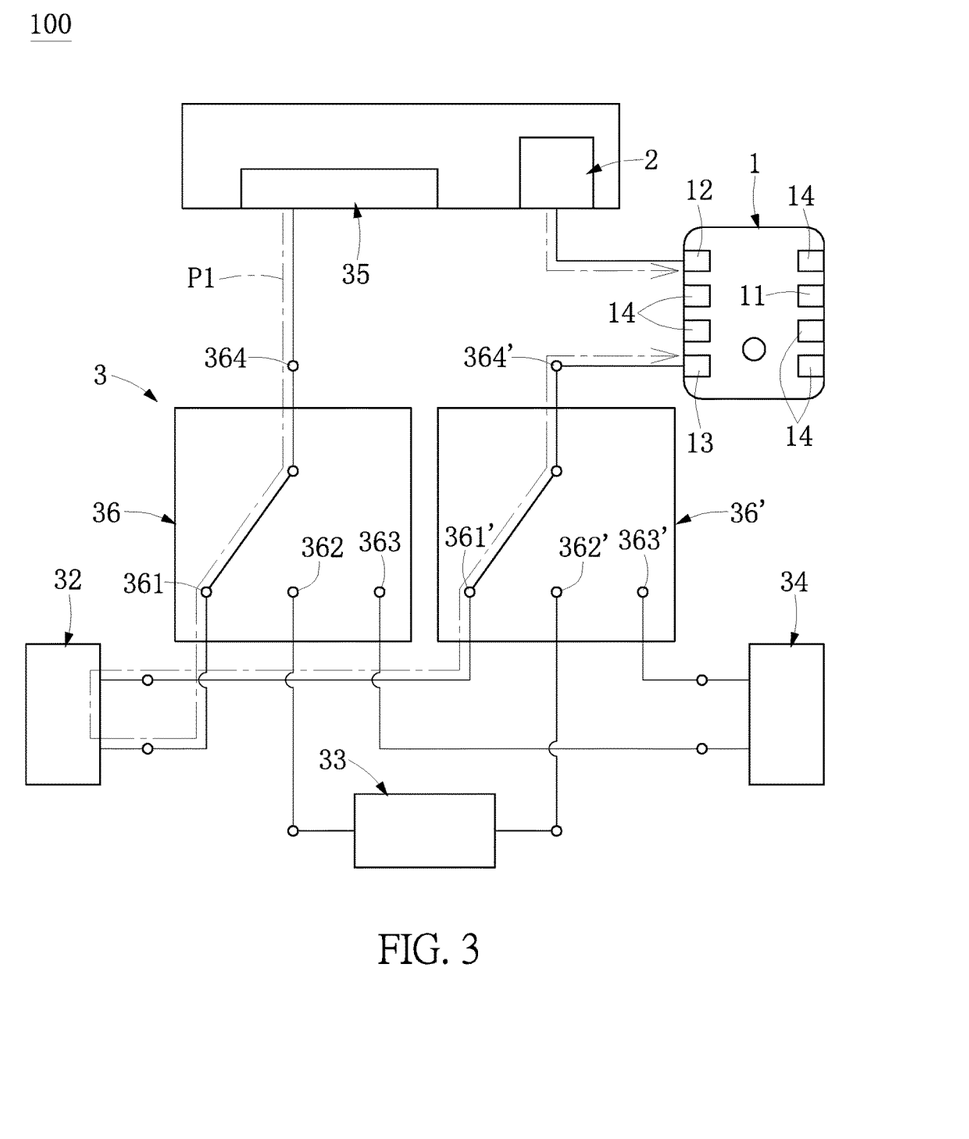
FIG. 3 is a schematic view showing a first signal path, which travels in the dual-frequency antenna device of FIG. 2.

Specifically, as shown in FIG. 3, when the two electrical connection points 364, 364' are respectively and electrically connected to the two first switching points 361, 361', the dual-frequency antenna device 100 establishes a first signal path P1, and the low-frequency antenna 35 is electrically connected to (or matched with) the first matching circuit 32 for being operated in a first low-frequency band.

Figure 4:
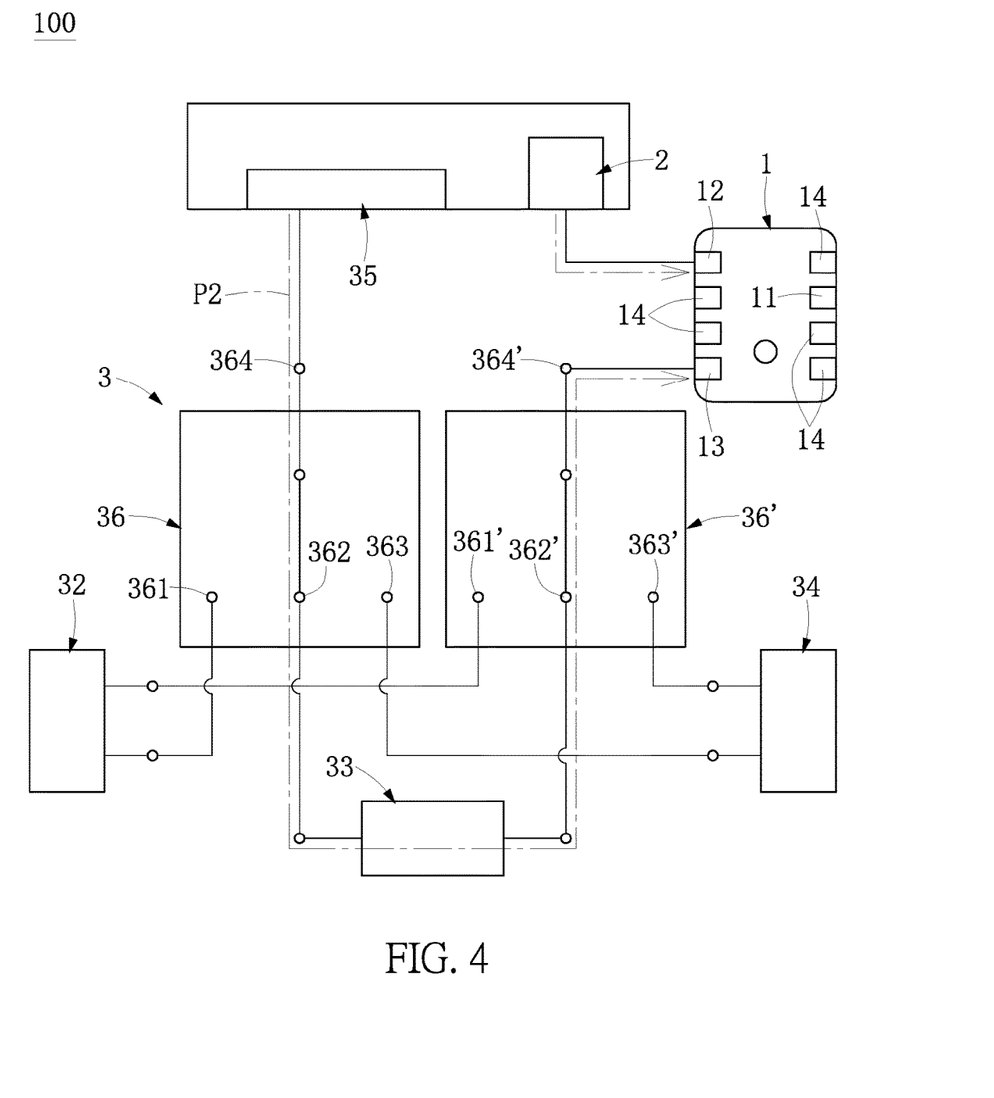
FIG. 4 is a schematic view showing a second signal path, which travels in the dual-frequency antenna device of FIG. 2.

As shown in FIG. 4, when the two electrical connection points 364, 364' are respectively and electrically connected to the two second switching points 362, 362', the dual-frequency antenna device 100 establishes a second signal path P2, and the low-frequency antenna 35 is electrically connected to (or matched with) the second matching circuit 33 for being operated in a second low-frequency band.

Figure 5:
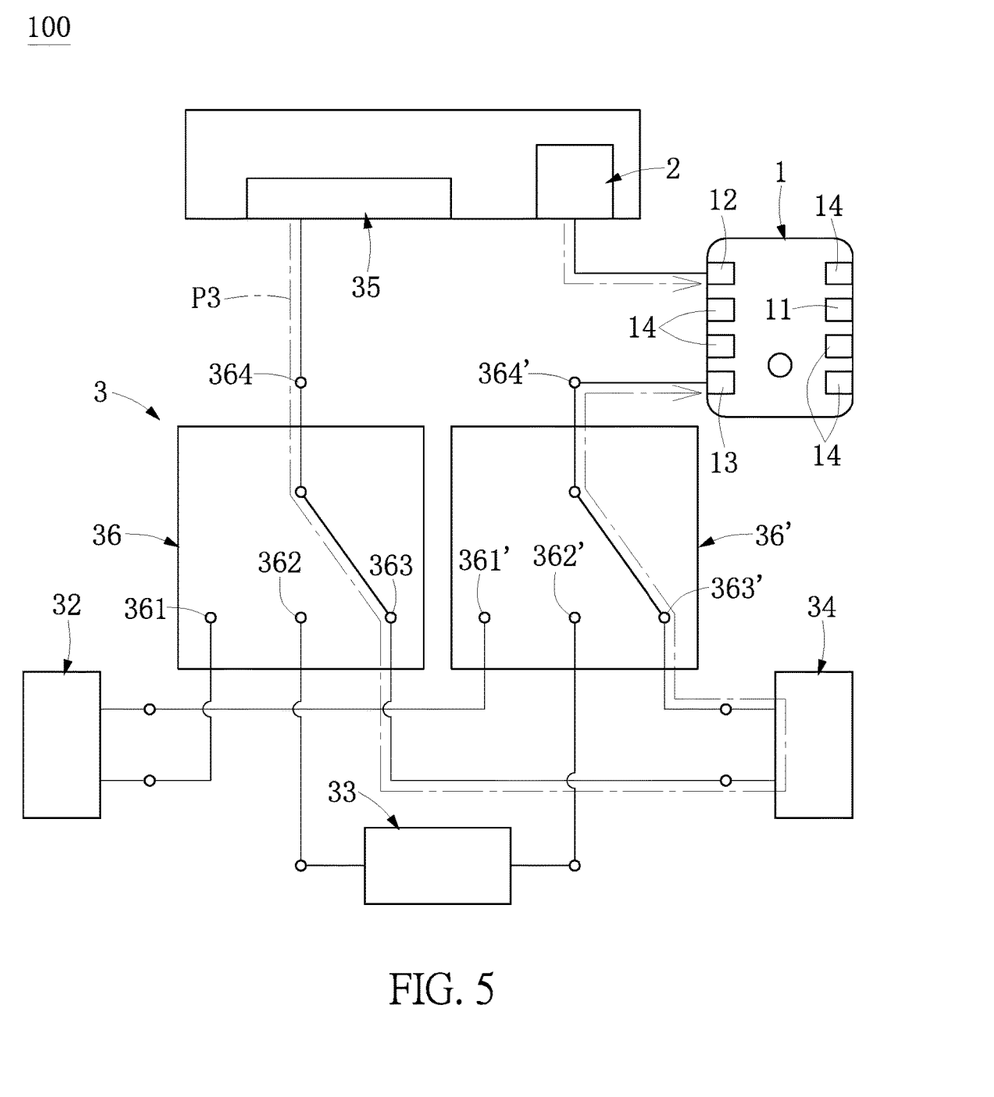
FIG. 5 is a schematic view showing a third signal path, which travels in the dual-frequency antenna device of FIG. 2.

As shown in FIG. 5, when the two electrical connection points 364, 364' are respectively and electrically connected to the two third switching points 363, 363', the dual-frequency antenna device 100 establishes a third signal path P3, and the low-frequency antenna 35 is electrically connected to (or matched with) the third matching circuit 34 for being operated in a third low-frequency band.

Accordingly, the first matching circuit 32, the second matching circuit 33, and the third matching circuit 34 are respectively arranged in the first signal path P1, the second signal path P2, and the third signal path P3, which are independent from each other, so that the first matching circuit 32, the second matching circuit 33, and the third matching circuit 34 do not interfere with each other. Thus, the low-frequency antenna 35 can be used to obtain a better antenna performance on the first low-frequency band, the second low-frequency band, and the third low-frequency band.

Figure 6:
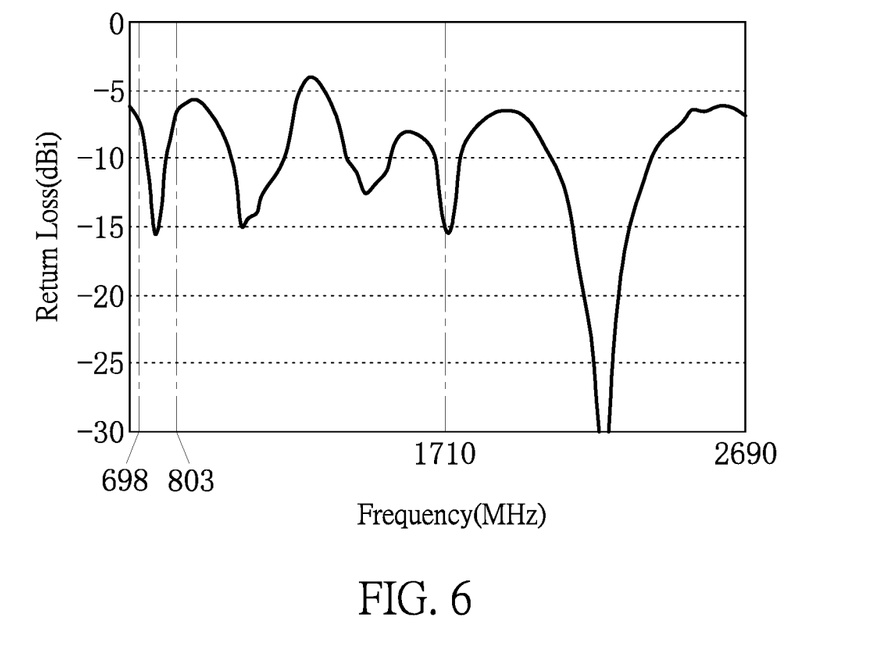
FIG. 6 is a first simulation diagram of the dual-frequency antenna device according to the first embodiment of the present disclosure.
Figure 7:
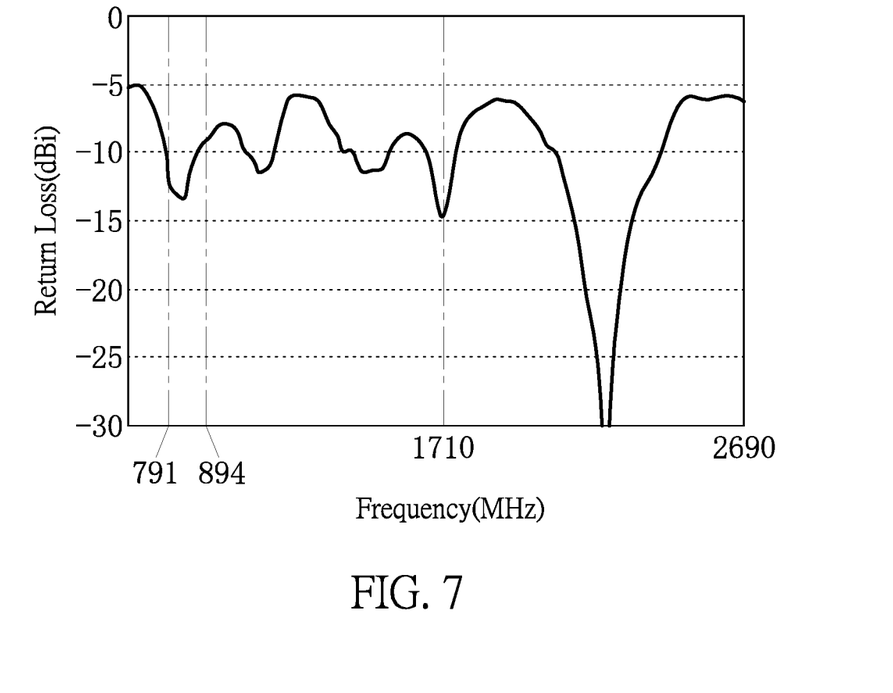
FIG. 7 is a second simulation diagram of the dual-frequency antenna device according to the first embodiment of the present disclosure.
Figure 8:
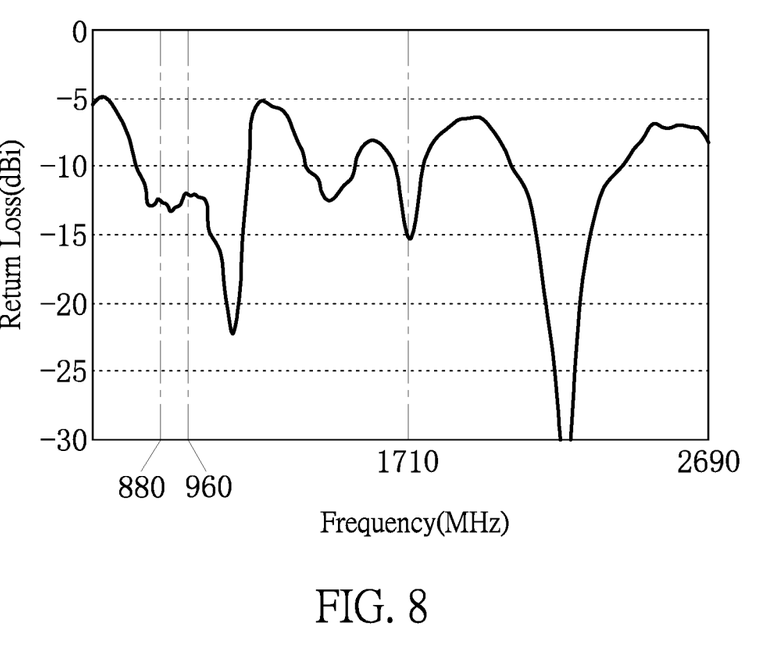
FIG. 8 is a third simulation diagram of the dual-frequency antenna device according to the first embodiment of the present disclosure.

In the present embodiment, the first low-frequency band, the second low-frequency band, and the third low-frequency band are different from each other. Specifically, the first low-frequency band in the present embodiment is within a range of 698 MHz to 803 MHz, the second low-frequency band in the present embodiment is within a range of 791 MHz to 894 MHz, and the third low-frequency band in the present embodiment is within a range of 880 MHz to 960 MHz. Reference is made to FIGS. 6 to 8, which illustrates the return loss simulation obtained from the dual-frequency antenna device 100 of the present embodiment, in which the dual-frequency antenna device 100 has a better performance of the return loss on the first low-frequency band, the second low-frequency band, and the third low-frequency band.

Moreover, reference is made to the following chart, which shows the antenna efficiency simulation obtained from the dual-frequency antenna device 100 of the present embodiment, in which the dual-frequency antenna device 100 has a better performance of the antenna efficiency on the first low-frequency band, the second low-frequency band, and the third low-frequency band.

| the first low-frequency band | | the second low-frequency band | | the third low-frequency band | |
|---|---|---|---|---|---|
| frequency (MHz) | antenna efficiency (dB) | frequency (MHz) | antenna efficiency (dB) | frequency (MHz) | antenna efficiency (dB) |
| 698 | −3.86 | 787 | −4.26 | 880 | −3.07 |
| 703 | −3.84 | 803 | −3.29 | 882 | −3.08 |
| 704 | −3.82 | 814 | −2.88 | 883 | −3.08 |
| 707 | −3.82 | 815 | −2.85 | 885 | −3.14 |
| 710 | −3.81 | 823 | −2.89 | 890 | −3.06 |
| 716 | −3.89 | 824 | −2.87 | 894 | −3.14 |
| 717 | −3.89 | 830 | −2.67 | 898 | −3.29 |
| 723 | −4.11 | 832 | −2.64 | 915 | −3.56 |
| 726 | −4.30 | 835 | −2.70 | 925 | −3.42 |
| 728 | −4.44 | 837 | −2.76 | 943 | −3.05 |
| 734 | −4.61 | 838 | −2.76 | 960 | −2.99 |
| 737 | −4.66 | 840 | −2.79 | | |
| 741 | −4.81 | 845 | −2.71 | | |
| 746 | −4.94 | 847 | −2.63 | | |
| 748 | −4.93 | 849 | −2.60 | | |
| 751 | −4.87 | 852 | −2.59 | | |
| 753 | −4.86 | 859 | −2.62 | | |
| 756 | −4.86 | 860 | −2.64 | | |
| 758 | −4.85 | 861 | −2.69 | | |
| 763 | −4.82 | 862 | −2.70 | | |
| 768 | −4.85 | 868 | −3.02 | | |
| 781 | −4.95 | 869 | −3.07 | | |
| 782 | −4.92 | 875 | −3.21 | | |
| 787 | −4.83 | 877 | −3.24 | | |
| 803 | −4.47 | 880 | −3.27 | | |
| | | 882 | −3.29 | | |
| | | 883 | −3.30 | | |
| | | 885 | −3.37 | | |
| | | 890 | −3.33 | | |
| | | 894 | −3.45 | | |

In addition, the two switching units 36, 36' in the present embodiment are installed in the DP3T switch 31, but the present disclosure is not limited thereto. In other embodiments, the two switching units 36, 36' of the present disclosure can be independently used or applied to other components.

Second Embodiment

Figure 9:
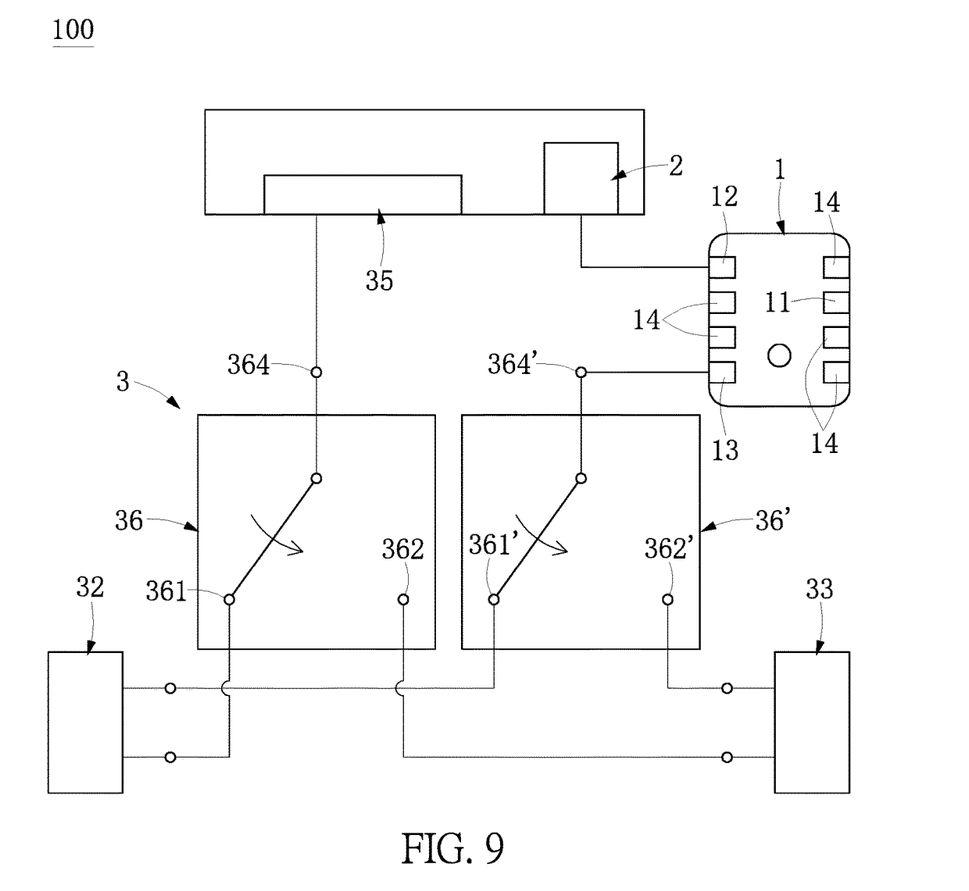
FIG. 9 is a schematic view showing the dual-frequency antenna device according to a second embodiment of the present disclosure.

Reference is made to FIG. 9, which illustrates a second embodiment of the present disclosure. The second embodiment is similar to the first embodiment, and the difference between the two embodiments is disclosed as follows.

Each of the two switching units 36, 36' in the present embodiment is provided without the third switching point 363, 363', and the two switching units 36, 36' are synchronously operated to electrically connect the two electrical connection points 364, 364' to the two first switching points 361, 361' or to the two second switching points 362, 362'.

Third Embodiment

Figure 10:
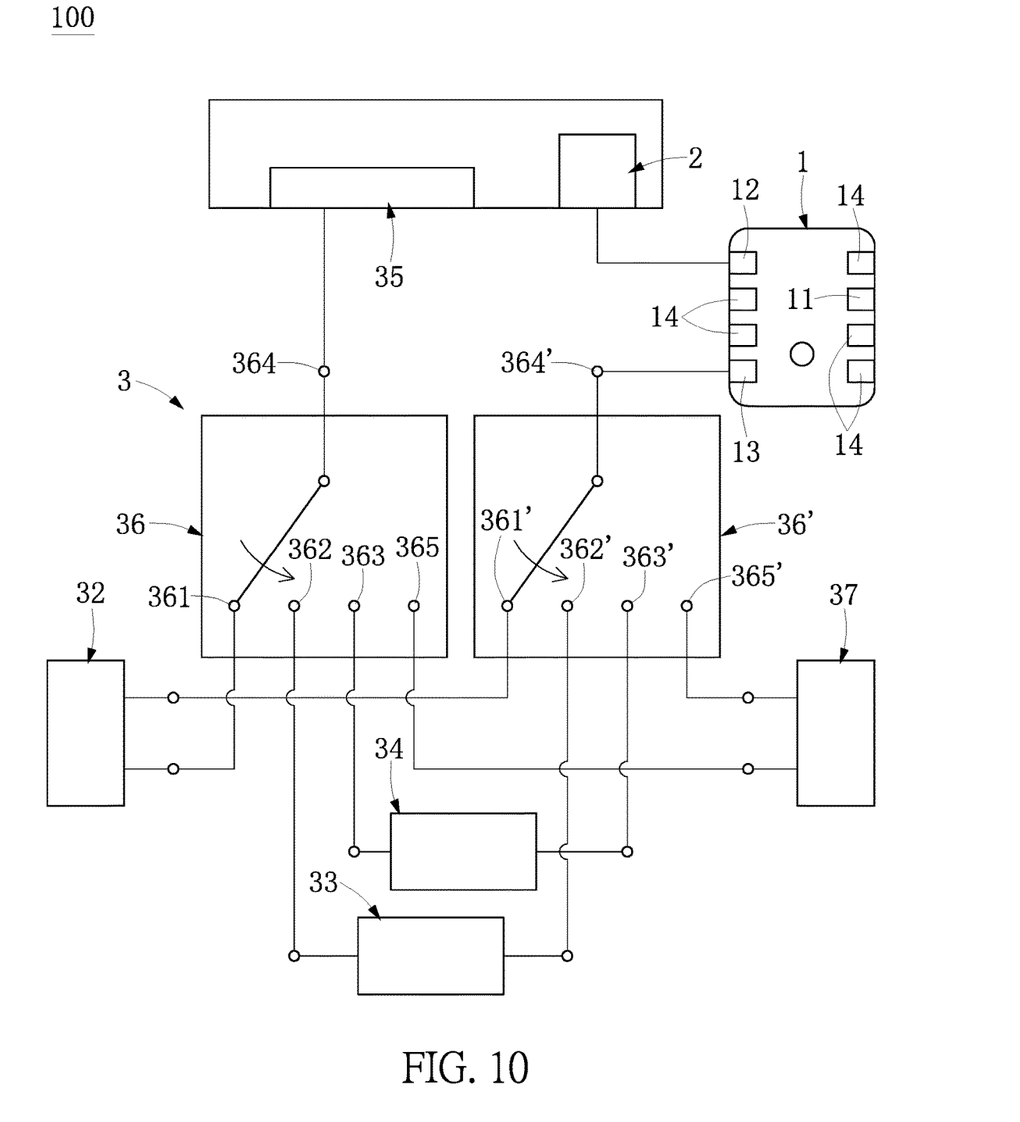
FIG. 10 is a schematic view showing the dual-frequency antenna device according to a third embodiment of the present disclosure.

Reference is made to FIG. 10, which illustrates a third embodiment of the present disclosure. The second embodiment is similar to the first embodiment, and the difference between the two embodiments is disclosed as follows.

Each of the two switching units 36, 36' in the present embodiment further includes a fourth switching point 365, 365' for being electrically connected to a fourth matching circuit 37, such that the DP3T switch 31 cannot be applied to the present embodiment.

The Effects of the Above Embodiments

In summary, for the dual-frequency antenna device or the low-frequency antenna module of the present disclosure, the different matching circuits (i.e., the first matching circuit, the second matching circuit, and the third matching circuit) are respectively arranged in the different signal paths (i.e., the first signal path, the second signal path, and the third signal path), which are independent from each other, so that the different signal paths do not interfere with each other. Thus, the low-frequency antenna can obtain a better antenna performance on the different low-frequency bands (i.e., the first low-frequency band, the second low-frequency band, and the third low-frequency band).

Moreover, the dual-frequency antenna device of the present disclosure adapts the DP3T switch having the two switching units installed therein, so that the dual-frequency antenna device does not need to design a layout for the two switching units. In other words, the DP3T switch in the present disclosure is applied to a unique manner different from the conventional manner, so that a DP3T switch, which is not cooperated with a low-frequency antenna, a first matching circuit, a second matching circuit, and a third matching circuit, is not the DP3T switch as required by the present disclosure.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A dual-frequency antenna device, comprising:
    a diplexer including an antenna contact, a high-frequency contact, a low-frequency contact, and a plurality of grounding contacts;
    a high-frequency antenna electrically connected to the high-frequency contact of the diplexer; and
    a low-frequency antenna module including:
        two switching units each including an electrical connection point, a first switching point, and a second switching point, wherein the two switching units are synchronously operated to electrically connect the two electrical connection points to the two first switching points or to the two second switching points;
        a first matching circuit electrically connected to the two first switching points of the two switching units;
        a second matching circuit electrically connected to the two second switching points of the two switching units; and
        a low-frequency antenna electrically connected to one of the two electrical connection points, and the other electrical connection point electrically connected to the low-frequency contact of the diplexer;
        wherein when the two electrical connection points are respectively and electrically connected to the two first switching points, the low-frequency antenna is electrically connected to the first matching circuit for being operated in a first low-frequency band; when the two electrical connection points are respectively and electrically connected to the two second switching points, the low-frequency antenna is electrically connected to the second matching circuit for being operated in a second low-frequency band different from the first low-frequency band.

2. The dual-frequency antenna device as claimed in claim 1, wherein the two switching units each further include a third switching point, and the two switching units are synchronously operated to electrically connect the two electrical connection points to the two first switching points, to the two second switching points, or to the third switching points; the low-frequency antenna module further includes a third matching circuit electrically connected to the two third switching points of the two switching units, wherein when the two electrical connection points are respectively and electrically connected to the two third switching points, the low-frequency antenna is electrically connected to the third matching circuit for being operated in a third low-frequency band different from the first low-frequency band and the second low-frequency band.

3. The dual-frequency antenna device as claimed in claim 2, wherein the first low-frequency band is within a range of 698 MHz to 803 MHz, the second low-frequency band is within a range of 791 MHz to 894 MHz, and the third low-frequency band is within a range of 880 MHz to 960 MHz.

4. The dual-frequency antenna device as claimed in claim 2, wherein the low-frequency antenna module further includes a DP3T switch, the two switching units are installed in the DP3T switch, and the DP3T switch includes two input terminals, two first output terminals, two second output terminals, two third output terminals, and a plurality of grounding terminals, wherein the two input terminals are respectively and electrically connected to the two electrical connection points, one of the two input terminals is electrically connected to the low-frequency antenna, and the other input terminal is electrically connected to the low-frequency contact of the diplexer, wherein the two first output terminals are respectively and electrically connected to the two first switching points and are electrically connected to the first matching circuit, wherein the two second output terminals are respectively and electrically connected to the two second switching points and are electrically connected to the second matching circuit, and wherein the two third output terminals are respectively and electrically connected to the two third switching points and are electrically connected to the third matching circuit.

5. The dual-frequency antenna device as claimed in claim 4, wherein any two different terminals of the two input terminals, the two first output terminals, the two second output terminals, and the two third output terminals are provided with at least one of the grounding terminals arranged there-between.

6. The dual-frequency antenna device as claimed in claim 1, wherein any two of the antenna contact, the high-frequency contact, and the low-frequency contact are provided with at least one of the grounding contacts arranged there-between.

7. A low-frequency antenna module, comprising:
    two switching units each including an electrical connection point, a first switching point, and a second switching point, wherein the two switching units are synchronously operated to electrically connect the two electrical connection points to the two first switching points or to the two second switching points;
    a first matching circuit electrically connected to the two first switching points of the two switching units;
    a second matching circuit electrically connected to the two second switching points of the two switching units; and
    a low-frequency antenna electrically connected to one of the two electrical connection points;
    wherein when the two electrical connection points are respectively and electrically connected to the two first switching points, the low-frequency antenna is electrically connected to the first matching circuit for being operated in a first low-frequency band; when the two electrical connection points are respectively and electrically connected to the two second switching points, the low-frequency antenna is electrically connected to the second matching circuit for being operated in a second low-frequency band different from the first low-frequency band.

8. The low-frequency antenna module device as claimed in claim 7, wherein the two switching units each further includes a third switching point, and the two switching units are synchronously operated to electrically connect the two electrical connection points to the two first switching points, the two second switching points, or to the third switching points; the low-frequency antenna module further includes a third matching circuit electrically connected to the two third switching points of the two switching units, wherein when the two electrical connection points are respectively and electrically connected to the two third switching points, the low-frequency antenna is electrically connected to the third matching circuit for being operated in a third low-frequency band different from the first low-frequency band and the second low-frequency band.

9. The low-frequency antenna module device as claimed in claim 8, wherein the first low-frequency band is within a range of 698 MHz to 803 MHz, the second low-frequency band is within a range of 791 MHz to 894 MHz, and the third low-frequency band is within a range of 880 MHz to 960 MHz.

10. The low-frequency antenna module device as claimed in claim 8, further comprising a DP3T switch, wherein the two switching units are installed in the DP3T switch, and the DP3T switch includes two input terminals, two first output terminals, two second output terminals, two third output terminals, and a plurality of grounding contacts, wherein the two input terminals are respectively and electrically connected to the two electrical connection points, one of the two input terminals is electrically connected to the low-frequency antenna, and the other input terminal is electrically connected to the low-frequency contact of the diplexer, wherein the two first output terminals are respectively and electrically connected to the two first switching points and are electrically connected to the first matching circuit, wherein the two second output terminals are respectively and electrically connected to the two second switching points and are electrically connected to the second matching circuit, and wherein the two third output terminals are respectively and electrically connected to the two third switching points and are electrically connected to the third matching circuit.

* * * * *